US012553779B2

(12) United States Patent
Bierweiler et al.

(10) Patent No.: US 12,553,779 B2
(45) Date of Patent: Feb. 17, 2026

(54) SELF-MONITORING SENSOR

(71) Applicant: Siemens Aktiengesellschaft, Munich (DE)

(72) Inventors: Thomas Bierweiler, Stutensee (DE); Tim Scherer, Karlsruhe (DE); Stefan Von Dosky, Karlsruhe (DE); Wolfgang Ens, Linkenheim (DE); Markus Hilsendegen, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/728,523

(22) PCT Filed: Jan. 11, 2023

(86) PCT No.: PCT/EP2023/050548
§ 371 (c)(1),
(2) Date: Jul. 12, 2024

(87) PCT Pub. No.: WO2023/135172
PCT Pub. Date: Jul. 20, 2023

(65) Prior Publication Data
US 2025/0085169 A1 Mar. 13, 2025

(30) Foreign Application Priority Data
Jan. 14, 2022 (DE) .......... 102022200354.3

(51) Int. Cl.
*G01K 1/14* (2021.01)
*G01K 1/143* (2021.01)
(Continued)

(52) U.S. Cl.
CPC .............. *G01K 1/14* (2013.01); *G01K 1/143* (2013.01); *G01K 1/16* (2013.01); *G01K 13/00* (2013.01);
(Continued)

(58) Field of Classification Search
CPC ........ G01K 1/14; G01K 13/00; G01K 15/007; G01K 1/143; G01K 1/16; G01K 13/02; G01K 7/427
See application file for complete search history.

(56) References Cited

U.S. PATENT DOCUMENTS 3,792,834 A * 2/1974 Billeter ................. F16L 19/061
285/348
5,581,019 A * 12/1996 Minor ................. G01M 13/005
73/114.77
(Continued)

FOREIGN PATENT DOCUMENTS

CA 2943058 10/2015
CN 107327706 A * 11/2017 ............... F17D 5/00
(Continued)

OTHER PUBLICATIONS

18728523_2025-01-31_CN_212868619_U_H.pdf,Nov. 7, 2017.*
(Continued)

*Primary Examiner* — Laura Martin
*Assistant Examiner* — Philip L Cotey
(74) *Attorney, Agent, or Firm* — Cozen O'Connor

(57) ABSTRACT

A control unit, an operating method and a self-monitoring sensor which is fastenable to a measurement object includes a holder projecting radially from the measurement object, wherein at least one sensor element is held in the holder and the sensor element is fixed by a compressive force exerted by an elastic element, where a first detector for detecting the compressive force is arranged in the region of the elastic element to monitor the installation of the self-monitoring sensor, where the self-monitoring sensor is initial provided in an active operating state, where the compressive force acting on the sensor element is detected, where an improper installation state of the self-monitoring sensor is identified if the compressive force detected in the second step falls below (Continued)

an adjustable threshold value, and where a warning about the improper installation state is output to a user and/or a superordinate control unit.

23 Claims, 5 Drawing Sheets

(51) Int. Cl.
*G01K 1/16* (2006.01)
*G01K 13/00* (2021.01)
*G01K 13/02* (2021.01)
*G01K 15/00* (2006.01)
*G01K 7/42* (2006.01)

(52) U.S. Cl.
CPC ........... *G01K 13/02* (2013.01); *G01K 15/007* (2013.01); *G01K 7/427* (2013.01)

(56) References Cited

U.S. PATENT DOCUMENTS

| | | | | |
|---|---|---|---|---|
| 6,879,257 | B2* | 4/2005 | Hisano | G08B 13/2462 370/254 |
| 10,598,553 | B2* | 3/2020 | Delgoshaei | G01K 3/14 |
| 11,415,470 | B2* | 8/2022 | Delgoshaei | F24F 11/62 |
| 11,593,927 | B2* | 2/2023 | Roeske | B64D 45/00 |
| 11,953,383 | B2* | 4/2024 | Tabelander | G01K 1/143 |
| 2003/0164763 | A1* | 9/2003 | Hisano | G08B 13/181 340/8.1 |
| 2004/0011415 | A1* | 1/2004 | Kakoschke | F16L 55/172 138/99 |
| 2004/0050167 | A1* | 3/2004 | Linares | G01N 29/225 73/152.01 |
| 2005/0217389 | A1* | 10/2005 | Foster | G01F 1/3209 73/861.22 |
| 2005/0276309 | A1* | 12/2005 | Koch | G01K 17/00 374/E7.042 |
| 2008/0201033 | A1* | 8/2008 | DeMersseman | G01S 13/86 701/1 |
| 2015/0345813 | A1* | 12/2015 | Rite | F24F 11/84 62/208 |
| 2017/0286572 | A1* | 10/2017 | Hershey | B64F 5/60 |
| 2017/0328781 | A1* | 11/2017 | Litteaur | G01K 7/06 |
| 2019/0353188 | A1* | 11/2019 | Golden | F16B 2/08 |
| 2020/0033197 | A1* | 1/2020 | Tamano | G01K 7/021 |
| 2020/0096394 | A1* | 3/2020 | Cavanaugh | F16L 3/1091 |
| 2020/0103287 | A1* | 4/2020 | Rud | G01K 7/021 |
| 2020/0182704 | A1* | 6/2020 | Hashemian | G01K 1/14 |
| 2020/0386624 | A1* | 12/2020 | Hu | G01K 1/18 |
| 2021/0181031 | A1* | 6/2021 | Tabelander | H03K 17/945 |
| 2023/0030690 | A1* | 2/2023 | Gebhardt | G01K 7/427 |
| 2023/0101179 | A1* | 3/2023 | Reuvers | G01K 13/02 374/29 |

FOREIGN PATENT DOCUMENTS

| | | | |
|---|---|---|---|
| CN | 212868619 | U * | 4/2021 |
| DE | 7733681 | | 2/1978 |
| DE | 29901792 | | 8/1999 |
| DE | 102004028359 | | 1/2006 |
| DE | 102007023877 | | 11/2008 |
| DE | 102013215388 | | 2/2015 |
| DE | 102021209278 | | 3/2023 |
| JP | 07309295 | A * | 11/1995 |
| JP | 2000505582 | A * | 5/2000 |
| JP | 2004309400 | A * | 11/2004 |
| JP | 2008215562 | A * | 9/2008 |
| WO | 2019063519 | | 4/2019 |

OTHER PUBLICATIONS

18728523_2025-01-31_JP_07309295_A_H.pdf, Nov. 28, 1995.*
18728523_2025-01-31_JP_2004309400_A_H.pdf,Nov. 4, 2004.*
18728523_2025-02-03_JP_2000505582_A_I.pdf,May 9, 2000.*
18728523_2025-02-03_JP_2008215562_A_H.pdf,Sep. 18, 2008.*
18728523_2025-02-05_CN_212868619_U_H.pdf,Apr. 2, 2021.*
PCT International Search Report and Written Opinion dated Apr. 19, 2023 based on PCT/EP2023/050548 filed Jan. 11, 2023.

* cited by examiner

SELF-MONITORING SENSOR

CROSS-REFERENCE TO RELATED APPLICATIONS

This is a U.S. national stage of application No. PCT/EP2023/050548 filed 11 Jan. 2023. Priority is claimed on German Application No. 10 2022 200 354.3 filed 14 Jan. 2022, the content of which is incorporated herein by reference in its entirety.

BACKGROUND OF THE INVENTION

1. Field of the Invention

The present invention relates to a self-monitoring sensor which can be fastened to a measurement object for detecting a measurement variable, an operating method for such a self-monitoring sensor, a control unit for implementing the operating method and to a computer program product for simulating an operational behavior of such a self-monitoring sensor.

2. Description of the Related Art

Unpublished German patent application DE 10 2021 209 278.0 discloses a temperature measuring apparatus for non-invasive measurement of a temperature, which comprises a holder in which a first and a second temperature sensor are received in a sleeve. The temperature sensors are mounted on a sensor carrier that is pressed via a spring against an end of the sleeve.

International application WO 2019/063519 A1 discloses a temperature measuring facility which has a plurality of temperature sensors, where one of the temperature sensors is pressed onto a container wall in an installed state.

U.S. Pub. No. 2008/201033 A1 discloses a system for recognizing a misalignment of a motor vehicle, which comprises a forward-looking sensor package and an inertia sensor. The inertia sensor is configured to recognize the misalignment of the motor vehicle during traveling of the vehicle.

Sensors are increasingly being used in process automation to monitor and control relevant systems in operation. Based on the increasing complexity in such systems, the aim exists to recognize sensors that are not capable of generating correct measurement values. This can be caused, for example, by an improper installation state of a sensor. Due, inter alia, to the increasing number of sensors in process automation systems, the requirement exists to recognize such states autonomously. Furthermore, the requirement exists to provide such a monitoring and recognition in a simple and economical manner.

SUMMARY OF THE INVENTION

It is an object of the invention to provide the possibility to for recognize an improper installation state of a sensor, which offers an improvement in at least one of the aspects described.

This and other objects and advantages are achieved in accordance with the invention with a self-monitoring sensor that can be fastened on a measurement object and that is configured, in a proper installed state, to detect a measurement variable that exists on or in the measurement object. The self-monitoring sensor is configured as a non-invasive temperature measuring apparatus. The measurement object is configured as a pipe. The self-monitoring sensor comprises a holder that can be releasably fastened to a wall of the measurement object. At least one sensor element is received in the holder, where the sensor element is configured to detect the measurement variable that exists on or in the measurement object. The at least one sensor element can be configured so that it can be removed in a non-destructive manner. Upon installation of the self-monitoring sensor, the at least one sensor element is brought into a proper installation position and is held in the proper installation position via an elastic element. The self-monitoring sensor has the elastic element via which a compression force is exerted upon the at least one sensor element. With the maintenance of the proper installation position of the sensor element, the sensor element is suitable for generating correct measurement values for the measurement variable.

In accordance with the invention, with the self-monitoring sensor, a first detector is arranged in the region of the elastic element, and configured to detect the compression force exerted by the elastic element on the sensor element. In particular, the first detector can be configured to detect a reduction of the compression force exerted by the elastic element. The elastic element can be configured, for example, as a spring, a disk spring, as an elastomer component, a strip exerting a restoring force or a combination thereof. With an improper influence upon the self-monitoring sensor, its components can be damaged so that a proper exertion of the compression force no longer occurs. From this follows the risk that the at least one sensor element leaves its proper installation position in the holder and generates incorrect measurement values for the measurement variable. Any influence via which a measurement accuracy of the measurement variable is at least reduced or a measurement of the measurement variable is impeded is to be understood as an improper influence.

A decrease in the compression force exerted on the at least one sensor element is reliably and quickly recognizable in a simple manner with the first detector. This is a relatively common cause for a loss of the proper functional capability of self-monitoring sensors. Consequently, numerous erroneous states of process automation systems are preventable via the self-monitoring sensor in accordance with the invention, so that the reliability and economic viability of such a process automation system is enhanced.

In accordance with the invention, within the inventive self-monitoring sensor, the first detector is configured as a switch. The switch can be configured, for example, as a pressure switch, a position switch, a microswitch or a micro-electromechanical system (MEMS). Furthermore, the elastic element is configured such that, upon a decrease of the compression force exerted, the at least one sensor element moves to actuate the switch. For this purpose, a stiffness of the elastic element can be adjusted and/or set accordingly. For example, an actuating characteristic of disk springs can be adjusted via suitable stacking and bundling. Switches and elastic elements of this type have an increased reliability, are easily available and permit the inventive self-monitoring sensor to be produced cost-effectively and autonomously monitored.

Furthermore, a second detection means is mounted within the self-monitoring sensor on the holder that faces away from the measurement object, in order to detect a spatial orientation of the holder. Herein, a spatial orientation is to be understood to be the alignment of a region of the holder in which its end facing away from the measurement object is situated. The second detector can be configured, for example, as an acceleration sensor via which the value and direction of the acceleration due to gravity is detectable. In this way, for example, an erroneous alignment of the self-monitoring sensor on the measurement object can be detected if it is displaced, bent or twisted via an action of a force. The second detector can be arranged, for example, in the region of, or on an end of, the holder, in particular, on an end of the holder facing away from the measurement object. Alternatively or additionally, the second detector can also be configured to detect a vibration of the self-monitoring sensor. With an evaluation of a detected vibration characteristic, for example, a changed effect of gravity can be recognized if the self-monitoring sensor is, for example, twisted or bent via an action of a force.

An improper installation state leads, in numerous cases, to a changed spatial orientation of the holder and thus of the self-monitoring sensor. With the second detector, minimal changes in the spatial orientation can also be precisely detected. Thus, improper installation states that are not perceptible to a user can also be autonomously recognized in a reliable way. Similarly, in this way, gradually arising improper installation states, for example, as a result of a material fatigue, are also precisely recognizable. The modes of operation of the first and second detectors are configured diversified. Even upon a failure of the first or second detectors, the respective other detector can still recognize an existing improper installation state. In this way, a so-called (n−1) redundancy is assured. Consequently, the inventive self-monitoring sensor is also suitable for use in safety-critical process automation systems, for example, chemical plants in which dangerous materials are handled.

Furthermore, the holder can be fastened within the self-monitoring sensor to the measurement object with a fastener. The self-monitoring sensor can be equipped with a third detector that is suitable to detect a mechanical stress state in the region of the fastener. The fastener can be, for example, a clamp or a clasp that is fastened on the measurement object during an installation of the self-monitoring sensor. In a contact region between the fastener and the holder, a mechanical stress state is created that can comprise tensile stresses, compression stresses and/or shear stresses in a plane of the contact region and/or perpendicularly to the contact region. The mechanical stress state can be detected in the contact region itself and adjacent to the contact region. The third detector can be arranged entirely or partially in the contact region between the fastener and a component of the monitoring sensor, for example, the holder or a thermal coupling element. Further, the third detector can be connected to the fastener or to the corresponding component of the self-monitoring sensor. For example, the third detector can be configured as strain gauges or as a fiber Bragg grating.

Damage to, and/or degradation of, a fastener also represents a common cause for the presence of an improper installation state. Further, given the action of a force on the self-monitoring sensor, via which it is, for example, displaced, the mechanical loading in the contact region, on which the fastener touches the self-monitoring sensor, is changed. This results in a change in the existing mechanical stress state. Strain gauges and fiber Bragg gratings can be configured in a compact and energy-saving manner. in this way, a lastingly reliable and simultaneously precise recognition of an improper installation state is ensured. The third detector is based upon another mode of operation than the first and the second detectors and is therefore diversified relative thereto. Additionally, in this way, the possible range of uses of the inventive self-monitoring sensor is further increased.

In accordance with a further embodiment, the self-monitoring sensor comprises a thermal coupling element that is configured to create a thermally conductive contact with the measurement object. The thermal coupling element can be fastened to the measurement object so that a heat flow from the wall of the measurement object into the self-monitoring sensor can form. A fourth detector can be arranged in the thermal coupling element, being configured to detect a proper installation of the self-monitoring sensor and thereby conversely also an improper installation state. Such an uneven thermal coupling can also be evoked by corrosion. Consequently, corrosion is also recognizable via the self-monitoring sensor. The fourth detector can be received in the thermal coupling element. Further, the fourth detector can be configured to detect a temperature distribution in the thermal coupling element. In a proper installation state, a characteristic temperature distribution becomes established in the thermal coupling element. In particular, symmetrical temperature distributions can arise, for example, in a thermal coupling element that is configured, viewed in a cross-section, to be substantially symmetrical. Furthermore, for example, in temperature measuring apparatuses for non-invasive temperature measurement, exact designs for thermal coupling elements are undertaken. The fourth detector permits known laws regarding the thermal behavior of the thermal coupling element to be used to recognize a proper or improper thermal contact between the thermal coupling element and the measurement object.

As a result of the action of forces on the self-monitoring sensor, the existing thermal contact between the thermal coupling element and the measurement object can be changed because these components shift relative to one another and/or a contact area between them is changed in its size or position. As a result, the temperature distribution in the thermal coupling element is influenced. In particular with a temperature measuring apparatus, for example, for a non-invasive temperature measurement, a change in the thermal contact between the thermal coupling element and the measurement object represents a substantial functional impairment. With the fourth detector, minimal influences on the self-monitoring sensor, which themselves lead to improper installation states, can be detected. The detection of the temperature distribution in the thermal coupling element represents a direct detection of the functional capability of the self-monitoring sensor and offers an early detection of improper installation states. In addition, the mode of operation of the fourth detector deviates from that of the first, second and third detectors and is diversified relative thereto. In this way, a further enhancement of the reliability of the claimed self-monitoring sensor is achieved.

Further, with the inventive self-monitoring sensor, the fourth detectors can be configured as at least two temperature sensors. The temperature sensors are therein received in the thermal coupling element oriented substantially parallel to the measurement object, i.e., along a measurement object axis. At least one of the temperature sensors can be configured substantially cylindrical and suitable for detecting a temperature prevailing on its outer surface.

Such an arrangement permits the two temperature sensors to be positioned relatively close to one another and simultaneously enables a simple installation thereof. Further, such an arrangement enables temperatures to be detected reliably in regions in the thermal coupling element that represent a characteristic temperature distribution for a proper operating state. Furthermore, with a substantially areal thermal connection of a temperature sensor, a reliable temperature detection is assured. As a result of at least one of the temperature sensors being received in the thermal coupling element, it is protected in the installed state. As a result, sensitive temperature sensors can also be used as the fourth detector.

Furthermore, the fourth detector can be arranged within the self-monitoring sensor symmetrically to a radial direction of the holder. In particular, the fourth detector can be configured as two temperature sensors that are arranged, relative to a radial line that extends through the thermal coupling element, symmetrically, that is opposingly. The thermal coupling element can itself be configured symmetrically, as seen in a cross-section, and symmetrically divided by the radial line. In a symmetrical thermal coupling element, during proper thermal contact with the wall of the measurement object, that is, a proper thermal connection, a temperature distribution which is symmetrical relative to the radial line becomes established.

Recesses, in particular bores, in which the temperature sensors are to be received can be produced symmetrically positioned in a simple manner with enhanced precision. Such a symmetrical temperature distribution can be established, for example, via subtraction between the two temperature sensors. Further, an adjustable tolerance range can be prescribed for such a difference. If the tolerance span is quantitatively exceeded, then a deviation from the proper temperature distribution can be recognized. Overall, a simple and simultaneously effective monitoring of a temperature distribution in the thermal coupling element is thereby brought about.

In a further embodiment, the self-monitoring sensor is provided with a fifth detector. The fifth detector is configured to detect an electrical variable in a circuit. The circuit in which the electrical variable is detected comprises a fastener via which the self-monitoring sensor can be connected to the measurement object. For example, two clamps that serve as the fastener for installation on the measurement object can be electrically conductively connected to one another through the wall of the measurement object. On releasing at least one fastener, its electrically conductive contact with the wall of the measurement object is interrupted, so that at least one electrical variable in the circuit changes. A forced shifting of at least one fastener, for example, via an improper action of a force can also lead to a change of the contact area on the electrically conductive contact, whereby a change in an electrical variable also results. Similarly, a gradual loss of the electrical contact between the fastener and the wall of the measurement object, which can arise, for example due to corrosion, is recognizable. The corresponding fifth detector can be configured as an electrical measuring apparatus, for example, as a "multimeter".

Electrical variables can be detected in a relatively simple manner with enhanced precision. Accordingly, slight improper actions of forces on the inventive self-monitoring sensor are also identifiable. In addition, improper installation states resulting from degradation, such as corrosion, are reliably recognizable. As a result, the inventive self-monitoring sensor has a broad possible spectrum of uses. The fifth detector is based upon another function than the first, second, third and fourth detectors and is therefore diversified in relation thereto. With the fifth detector, the principle of an (n−1) redundancy can be realized in a further expanded form. Thereby, the inventive self-monitoring sensor is also suitable for safety-critical applications.

The object and advantages in accordance with the invention are also achieved by an operating method for a self-monitoring sensor. The self-monitoring sensor comprises a holder in which a sensor element is received that is fixable by a compression force. The compression force is exerted by an elastic element, for example, a spring. The operating method comprises a first step in which a provision of the self-monitoring sensor takes place in an active operating state. An active operating state should be understood to be a state in which the self-monitoring sensor is installed on the measurement object and is functioning correctly. The self-monitoring sensor can be configured, for example, as a non-invasive temperature measuring apparatus with which a temperature of a fluid in the measurement object can be measured. The operating method further has a second step in which the compression force acting upon the sensor element, via which the sensor element can be held in a proper installation position, is detected. The method also involves a third step in which an improper installation state of the self-monitoring sensor is recognized if the compression force detected in the second step falls below a settable threshold value. The threshold value can be set via user input, a value table, an algorithm and/or a computer program product. If the existing compression force falls below the adjustable threshold value, it should be assumed that the sensor element is no longer in the proper installation position, i.e., the improper installation state exists in the self-monitoring sensor. With a setting of the threshold value, a sensitivity of the operating method can be pre-set. Further, the operating method comprises a fourth step in which a warning is output to a user and/or a higher-order control unit. As a result of the warning, inspection and/or servicing of the self-monitoring sensor can be initiated. The warning can be output, for example, visually via a display unit or acoustically via a warning tone to the user. The higher-order control unit can be configured, for example, as a programmable logic controller (PLC), as a master computer or as a cloud computer that is connected directly or indirectly to the self-monitoring sensor.

The operating method in accordance with the invention permits an existing improper installation state to be recognized automatically. The operating method is based upon a simple and thereby particularly reliable mechanism of action for the detection of the compression force that acts upon the sensor element. For such compression forces, compact, cost-effective and robust detectors are available. Similarly, the operating method in accordance with the invention operates with a minimum of computation power and can also readily be implemented on a self-monitoring sensor in a complex process automation system. The compression force can be detected precisely. As a result, slight improper installation states can be recognized. This, in turn, permits a low-inspection operation of the self-monitoring sensor in process automation systems that place increased demands upon the measurement accuracy and/or the availability of the self-monitoring sensor. The operating method in accordance with the invention can be advantageously configured with a self-monitoring sensor in accordance with at least one disclosed embodiment.

In one embodiment of the inventive operating method, in the second step, a spatial orientation of the self-monitoring sensor is also detected. A spatial orientation should be understood to mean an alignment of a component of the self-monitoring sensor in space, for example, its holder. The spatial orientation can be related to a substantially unchangeable direction, for example, a direction of action of gravity. In order to detect the spatial orientation, the self-monitoring sensor can have a second detector. Furthermore, in the third step, an improper installation state is recognized if the spatial orientation of the self-monitoring sensor detected in the second step deviates from an adjustable tolerance. The tolerance can herein comprise at least one angle and/or an amount, via which the spatial orientation detected in the second step can be evaluated, for example, as a vector. The tolerance also relates to a reference direction. Accordingly, in the third step, a tilting of the self-monitoring sensor is recognizable, via which an improper installation state exists. Based on the spatial orientation, an existing improper installation state is recognizable independently of the detected compression force on the sensor element. Alternatively or additionally, the recognition of the improper installation state based on the compression force can be used to monitor the recognition of the improper installation state based on the spatial orientation in the operating method in accordance with the disclosed embodiment, i.e., check it for plausibility, or vice versa. Similarly, a defect or a degradation of the corresponding detector are recognizable. For this purpose, when the improper installation state is recognized, a degree of improperness can be quantified.

The detection of the spatial orientation and the detection of the compression force that acts upon the sensor element represent different modes of operation that are therefore mutually diversified. As a result, a safe redundancy is provided and the principle of an (n−1) redundancy can be realized. The inventive operating method is therefore also reliably usable in safety-critical applications, i.e., process automation systems. Consequently, improper installation states of self-monitoring sensors are also automatically recognizable under demanding wear-promoting operating conditions. In particular, if the spatial orientation in relation to the gravitational acceleration or gravity is established, then an unchanging reference is provided and thus an increased degree of reliability can be achieved.

Furthermore, in accordance with the inventive operating method, in the second step, via a third detector, a mechanical stress state on a surface of the holder, a thermal coupling element or a fastener via which the self-monitoring sensor is fastened to the measurement object, can be detected. The mechanical stress state can herein comprise tensile stresses, compression stresses and/or shear stresses in a plane of the surface and/or perpendicularly to the surface. In order to detect the mechanical stress state, the self-monitoring sensor can be provided with a third detector. Furthermore, in the third step, an improper installation state is recognized if the mechanical stress of the mechanical stress state falls below an adjustable limit stress. The mechanical stress can be a tensile stress, a compression stress, a shear stress or a combination thereof. Corresponding thereto, the limit stress that is pre-settable by the user and/or a higher order control unit can be configured. Such mechanical stress states on the surface of the holder, the thermal coupling element or the fastener are detectable via a third detector that is configured as at least one strain gauge. Alternatively or additionally, a mechanical stress state in the interior of the holder, the thermal coupling element or the fastener can be detected via a third detector that is configured, for example, as a fiber Bragg grating. The third detector can be placed at a position in the region of the fastener at which, given an improper installation state, a significant change in the existing mechanical stress state is to be expected.

The detection of a mechanical stress state is based upon a different mode of operation from the detection of the compression force that acts upon the sensor element and they are therefore mutually diversified. Further, the detection of the mechanical stress state is diversified relative to the detection of the spatial orientation. Accordingly, via the detection of the mechanical stress state, the level of redundancy and thus also of reliability can be enhanced. Mechanical stress states are detectable with a reduced energy expenditure and can be compared, with a reduced energy expenditure, with the adjustable limit stress. Furthermore, for example, given a shifting of a fastener, a necessarily changed mechanical loading occurs in a component of the self-monitoring sensor. Furthermore, via a detection of the corresponding mechanical stress state, creepingly occurring improper installation states are recognizable, for example, in the form of a degradation.

In addition, in accordance with the inventive operating method, in the second step a temperature distribution in the thermal coupling element of the self-monitoring sensor can be detected. This should be understood, for example, as a temperature distribution in a cross-section of the thermal coupling element that results, inter alia, from a temperature of the fluid and an ambient temperature. In order to detect the temperature distribution, a prevailing temperature can be detected at at least two positions in the cross-section of the thermal coupling element. This can be performed via a fourth detector. Furthermore, in the third step, an improper installation state of the self-monitoring sensor is recognized if the temperature distribution detected in the second step deviates from a reference distribution by an adjustable tolerance span. The reference distribution herein represents a temperature distribution that results, during operation, in a proper installation state. The reference distribution can be specified in absolute temperature values or as relative temperature values, for example, temperature ratios. The tolerance span is configured and defines, corresponding to the reference distribution, how far the existing temperature distribution can deviate from the reference distribution without an improper installation state having to be assumed. The tolerance span can be specified by a user, a value table, an algorithm or an artificial intelligence. The temperature distribution in the thermal coupling element is influenced, inter alia, by how large the existing thermal contact area is, via which the thermal coupling element is thermally connected to the wall of the measurement object, and where it is situated. In a position and/or size of the thermal contact area on the thermal coupling element deviating from a proper installation state, where the contact area forms a thermal coupling to the wall of the measurement object, and the temperature distribution in the thermal coupling element is changed.

With the detection of the temperature distribution in the thermal coupling element, a further possibility is provided to recognize the presence of an improper installation state. The mode of operation of a detection of a temperature distribution deviates from the detection of a compression force so that they are diversified from one another. Equally, the detection of the temperature distribution is also diversified from the detection of the spatial orientation of the self-monitoring sensor and from the detection of the mechanical voltage distribution. The inventive operating method is thus redundant and further realizes the principle of an (n−1) redundancy. Furthermore, self-monitoring sensors that are configured as temperature measuring apparatuses are already equipped with suitable temperature sensors that are usable as fourth detectors during the detection of the temperature distribution. The inventive operating method can thus be implemented cost-effectively with a reduced expenditure of hardware.

In addition, in accordance with the operating method, in the second step an electrical variable of a circuit can also be detected. The circuit comprises at least two fastening means of the self-monitoring sensor. Accordingly, at least in a proper installation state, a current flow occurs through the fastener. In the third step, an improper installation state of the self-monitoring sensor is recognized if the electrical variable detected in the second step deviates quantitatively from a reference value at least by an adjustable tolerance value. As a result of a change of a position of at least one fastening means, the electrical variable is amended in the circuit. The electrical variable can be a resistance value, a conductance, a voltage, a current strength, a capacitance and/or an inductance. The tolerance value can be specified by a user, a value table, an algorithm and/or an artificial intelligence. With the tolerance value, a sensitivity of the claimed operating method can be specified. Furthermore, the electrical variable can be detected enduringly, i.e., continuously or regularly repeatedly to recognize a creeping occurrence of an improper installation state. In particular, the circuit can be configured such that, in the proper installation state, the two fasteners are connected in an electrically conductive manner to the wall of the measurement object. On an action of a force via which an electrically conductive contact area between the wall of the measurement object and one of the fasteners is changed in its size, a change in the electrical variable occurs, which is detected.

Changes in electrical variables are measurable with an increased accuracy so that slight deviations from a proper installation state are also recognizable. Similarly, phenomena such as a degradation, such as via corrosion, on the fastener are recognized. The detection of the electrical variable is also robust against environmental conditions such as air pressure, temperature, vibration, the effects of dust or noise. The detection of the electrical variable is based, compared with the detection of the compression force, the detection of the spatial orientation of the self-monitoring sensor, the detection of the mechanical stress state and the detection of the temperature, upon a different mode of operation and is therefore diversified therefrom. In this way, the principle of the (n–1) redundancy is further realized. The operating method in accordance with disclosed embodiments is therefore redundant and can consequently be performed with increased reliability.

The objects and advantages in accordance with the invention are also achieved by a control unit in accordance with the invention. The control unit in accordance with the invention is configured for monitoring a self-monitoring sensor system that comprises a self-monitoring sensor that can be coupled to the control unit.

In accordance with the invention, the control unit is configured to implement an operating method on the self-monitoring sensor in accordance with at least one of the above-disclosed embodiments. The control unit is configured as a local control unit and has a computing unit (processor) and a storage unit (memory) that is configured to implement a computer program product. The computer program product can be configured to receive measurement signals from a self-monitoring sensor and to process them and to implement at least one of the above-described embodiments of operating method. Therein, the computer program product can be configured monolithically or modularly. A monolithic computer program product should be understood as being able to be executed on a single hardware platform. A modular computer program product should be understood as being able to be executed in the form of subprograms on separate hardware platforms that are connected to one another communicatively for realizing the functionality striven for. Accordingly, the control unit in accordance with the invention can also be configured as a computer cloud. The control unit can further be configured so that it can be connected to a display unit via which the warning regarding the existing improper installation state can be displayed to a user. Further, the control unit can be connected to a higher-order control unit via a communicative data connection which can be configured as a network connection, Internet connection or radio connection, in particular as a mobile radio connection. Similarly, the control unit can be connected to the self-monitoring sensor via a communicative data connection which can be configured as a network connection, Internet connection or radio connection, in particular as a mobile radio connection.

The underlying operating method can be executed with a reduced computation effort. Accordingly, the control unit in accordance with the invention is suitable to implement at least one of the above-disclosed embodiments of the operating methods rapidly and precisely with simple and efficient hardware. Further, it permits the control unit in accordance with the invention to adapt, to update the fundamental operating method in a simple manner, via user inputs or updates, and to integrate it into an existing process automation system.

Similarly, the objects and advantages are achieved in accordance with the invention by a computer program product in accordance with the invention for simulating an operating behavior of a self-monitoring sensor. The self-monitoring sensor, the operating behavior of which is to be simulated, is installed on a measurement object for detecting a measurement variable.

In accordance with the invention, the self-monitoring sensor is configured in accordance with one of the above-described embodiments. The computer program product can be configured as a digital twin in accordance with the above-described embodiments of the self-monitoring sensor. The computer program product is usable for a simulation of the operating behavior of a correspondingly configured self-monitoring sensor. The computer program product can have a physics module for simulation in which the self-monitoring sensor is at least partially mapped. For this purpose, for example, the self-monitoring sensor can be emulated in its construction and its mode of operation. Alternatively or additionally, the self-monitoring sensor can also be configured as a computing model in the physics module. The physics module is configured, inter alia, to adjust the thermal behavior of the self-monitoring sensor under settable operating conditions. The settable operating conditions include, for example, an ambient temperature, a temperature of the fluid in the measurement object, a thermal conductivity of the fluid, the wall of the measurement object and/or the thermal coupling element, a thermal conduction behavior in the thermal coupling element, a kinematic behavior of the self-monitoring sensor during an action of a force in the proper installation state, and/or a deformation behavior of at least one component of the self-monitoring sensor. The computer program product can have a data interface via which corresponding data can be specified via a user input and/or other simulation-directed computer programs. Similarly, the computer program product can have a data interface for an output of simulation results to a user and/or other simulation-directed computer program products. With the computer program product, for example, a defective first, second, third, fourth and/or fifth detector of the self-monitoring sensor, a faulty installation of the self-monitoring sensor and/or a faulty functioning of a further device of a process automation system connected upstream or downstream of the self-monitoring sensor can be recognized. In particular, the operating behavior of the self-monitoring sensor that is expressed by its measurement signals can be checked for plausibility via a comparison with the simulated self-monitoring sensor. Furthermore, the self-monitoring sensor can be modeled in a simple manner, i.e., its operating behavior can be checked with a minimum of finite element calculations. The computer program product in accordance with the invention thus permits a modeling of the underlying self-monitoring sensor with a reduced requirement for computation power. As a result, a large number of such self-monitoring sensors can be emulated, for example, in an "operator station" of a process automation system. Thus, overall, a particularly realistic process mapping can be provided in a simple manner. The computer program product can be designed as a digital twin, as described, for example, U.S. Pub. No. 2017/286572 A1, the content of which is incorporated herein by reference in its entirety. The computer program product can be formed monolithically, i.e., it can implement all its functions on one hardware platform. Alternatively, the computer program product can also be formed modularly and can comprise a plurality of partial programs that can be executed on separate hardware platforms and cooperate via a communicative data connection. Such a communicative data connection can be a network connection, an internet connection and/or a mobile radio connection. Furthermore, via the computer program product in accordance with the invention, a self-monitoring sensor can be tested and/or optimized through simulation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described in greater detail by reference to embodiments in the different drawings. The drawings are to be considered as mutually complementary to the extent that the same reference signs in the different drawings have the same technical meaning. The features of the individual embodiments are also capable of being combined with one another. Furthermore, the embodiments shown in the drawings are capable of being combined with the features outlined above, in which.

DETAILED DESCRIPTION OF THE EXEMPLARY EMBODIMENTS

Figure 1:
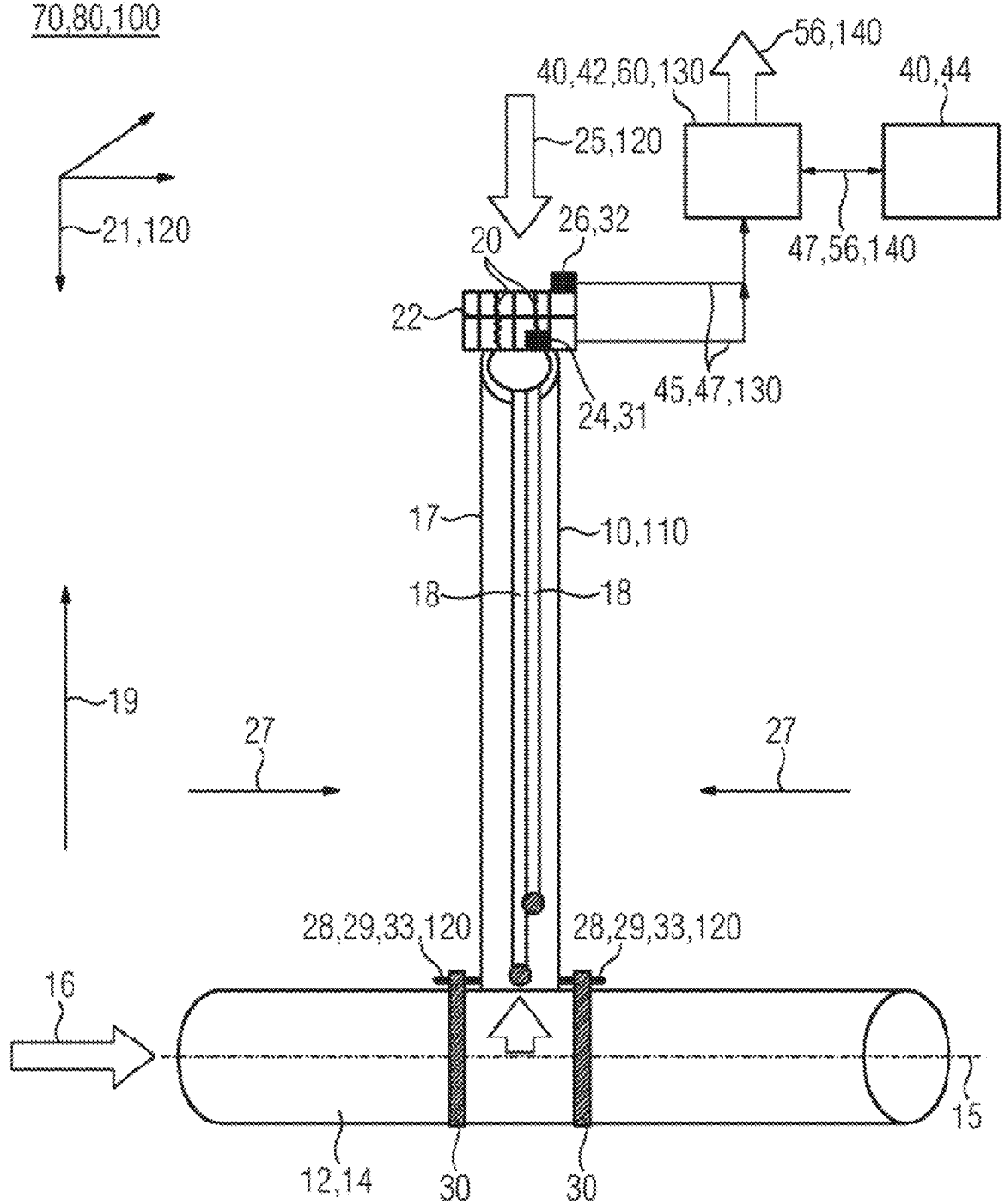
FIG. 1 shows a schematic structure of a first embodiment of the inventive self-monitoring sensor.

FIG. 1 shows a schematic structure of a first embodiment of the self-monitoring sensor 10 in a side view. The self-monitoring sensor 10 is installed on a wall 14 of a measurement object 12 that is configured as a pipe. The pipe extends along a measurement object axis 15, i.e., a pipe axis. Received in the measurement object 12 is a fluid 16 that has physical variables of which at least one is to be measured by the self-monitoring sensor 10. The self-monitoring sensor 10 has a holder 17 in which two sensor elements 18 are received and which are configured as temperature sensors. Arranged on a radial outer end of the holder 17 are elastic elements 20, each of which exerts a compression force 25 upon one of the sensor elements 18. A radial direction 19 is herein symbolized by the corresponding arrow. The corresponding sensor elements 18 are thus held in their proper installation position via the compression force 25. Similarly, in the region of the elastic elements 20, a first detector 31 is arranged, which is connected to a housing 22 that is mounted on the radially outer end of the holder 17. The first detector 31 is configured as a switch 24 that can be triggered via a reduction in the compression force 25. Furthermore, a second detector 32 that is configured as an acceleration sensor 26 is arranged on the housing 22. With the second detector 32, a spatial orientation 21 of the holder 17, and therefore of the self-monitoring sensor 10, can be detected. Furthermore, the holder 17 is fastened to a radially inner end via fastening means 30 on the measurement object 12. At this location, the holder 17 is provided with a third detectors 33 that are each configured as strain gauges 28. The third detectors 33 are each configured to detect a mechanical stress state 29 on the holder 17 in the region of a contact with the respective fastener 30.

The first detector 31, the second detector 32 and the third detectors 33 are each connected to a control unit 40 that is configured as a local control unit 42. The variables detected by the first detector 31, the second detector and the third detectors 33 can be transferred as measurement signals 45 to a control unit 40 via a communicative data connection 47. The control unit 40 is configured as a local control unit 42 that is directly associated with the self-monitoring sensor 10. The local control unit 42 is connected via a further communicative data connection 47 to a higher-order control unit 44 that also belongs functionally to the control unit 40 of the self-monitoring sensor 10. With the local control unit 42, a warning 56 can be output to a user (not shown in detail) and the higher-order control unit 40. The self-monitoring sensor 10 forms, with the control unit 40, that is, the local and the higher-order control unit 44, a self-monitoring sensor system 80.

During proper operation, the actions of forces 27 impinge upon the self-monitoring sensor 10, via which it can enter into an improper installation state. In an improper installation state, the sensor elements 18 generate incorrect measurement values. In order to recognize such an improper installation state, an operating method 100 is implemented. The operating method 100 comprises a first step 110 in which the self-monitoring sensor 10 is provided in an active operating state in which it is properly installed on the measurement object 12. The stage of the operating method 100 shown in FIG. 1 assumes that the first step 110 has already been completed. Accordingly, force is exerted upon the sensor element 18 and is detected in a second step 120. For this purpose, the first detector 31 is usable, which is configured as a switch 24 in the region of a housing 22. With a reduction of the compression force 25, an actuation of the switch 24 can be caused. With the switch 24, measurement signals 45 can be generated that are conducted via a data connection 47 to a control unit 40. As a result of the measurement signals 45, at least a reduction of the compression force 25 acting can be represented. Furthermore, the sensor 10 is provided with a second detector that is configured as an acceleration sensor 26. During the second step 120, a spatial orientation 21 of the sensor 10 is detected and also output as a measurement signal 45 to a control unit 40 that is configured as a local control unit 42. The spatial orientation 21 is symbolized in FIG. 1 with a three-dimensional coordinate system. Similarly, in the second step 120, with the third detectors 33 on the surface of the holder 17, a mechanical stress state 29 is detected. The detected mechanical stress state 29 is also output as a measurement signal 45 to the control unit 40, in particular, the local control unit 42.

The measurement signals 45 are processed in a third step 130 by the control unit 40 that is configured as a local control unit 42 that is associated with the sensor 10. The control unit 40 is configured to implement the operating method 100 with a monitoring program 60 that is stored on the control unit 40 such that it can be executed. In the third step 130, a recognition of an improper installation state of the self-monitoring sensor 10 occurs if the compression force 25 that is detected in the second step 120 falls below a settable threshold value. The threshold value can be set via a user input or via a control unit 40 that is configured as a higher-order control unit 40 44. Alternatively or additionally, an improper installation state is recognized if the spatial orientation 21 of the sensor 10 deviates from a settable tolerance. The tolerance of the spatial orientation 21 can also be set via a user input and/or the control unit 40, in particular, the higher-order control unit 40. Further alternatively or additionally, an improper installation state is recognized if at least one stress that belongs to the mechanical stress state 29 or is derived therefrom, exceeds a settable limit stress. The limit stress is also correspondingly adjusted via a user input and/or the higher-order control unit 40 44. An instance of falling below the limit stress can herein reflect a shifting of the sensor in the holder 17. For recognition of the improper installation state, the measurement signals 45 from the first detection means 31, from the second detector and/or from the third detectors 33 can be used to implement a mutual plausibility check. For example, the improper installation state can be effectively ascertained, i.e., recognized, via the operating method 100 only if this is indicated via the detectors in accordance with a majority principle. Alternatively, an improper installation state can be recognized if at least one of the detectors indicates one such.

There follows a fourth step 140 in which a warning 56 is output if, in the third step 130, an improper installation state of the sensor is recognized. The output of the warning 56 regarding the existing improper installation state of the sensor is output to a user and/or the higher-order control unit 40 44. For this purpose, the local control unit 42 is connected via a data connection 47 to the higher-order control unit 44. The warning 56 can be configured, inter alia, as a visual or an acoustic warning signal. Further, a computer program product 70 (not described in detail) is provided that is configured to simulate the operating behavior of a self-monitoring sensor 10 10, as shown in FIG. 1. With the computer program product 70, for example, a defective component of the self-monitoring sensor 10 can be identified. In particular, a defective first detector 31, second detector and/or third detectors 33 can be recognized. Accordingly, the defective detection can be ignored during an operation of the self-monitoring sensor system without further impairment of the functional capability. As a result, premature warning processes on the self-monitoring sensor 10 can be prevented. For this purpose, the computer program product 70 is configured as a digital twin.

Figure 2:
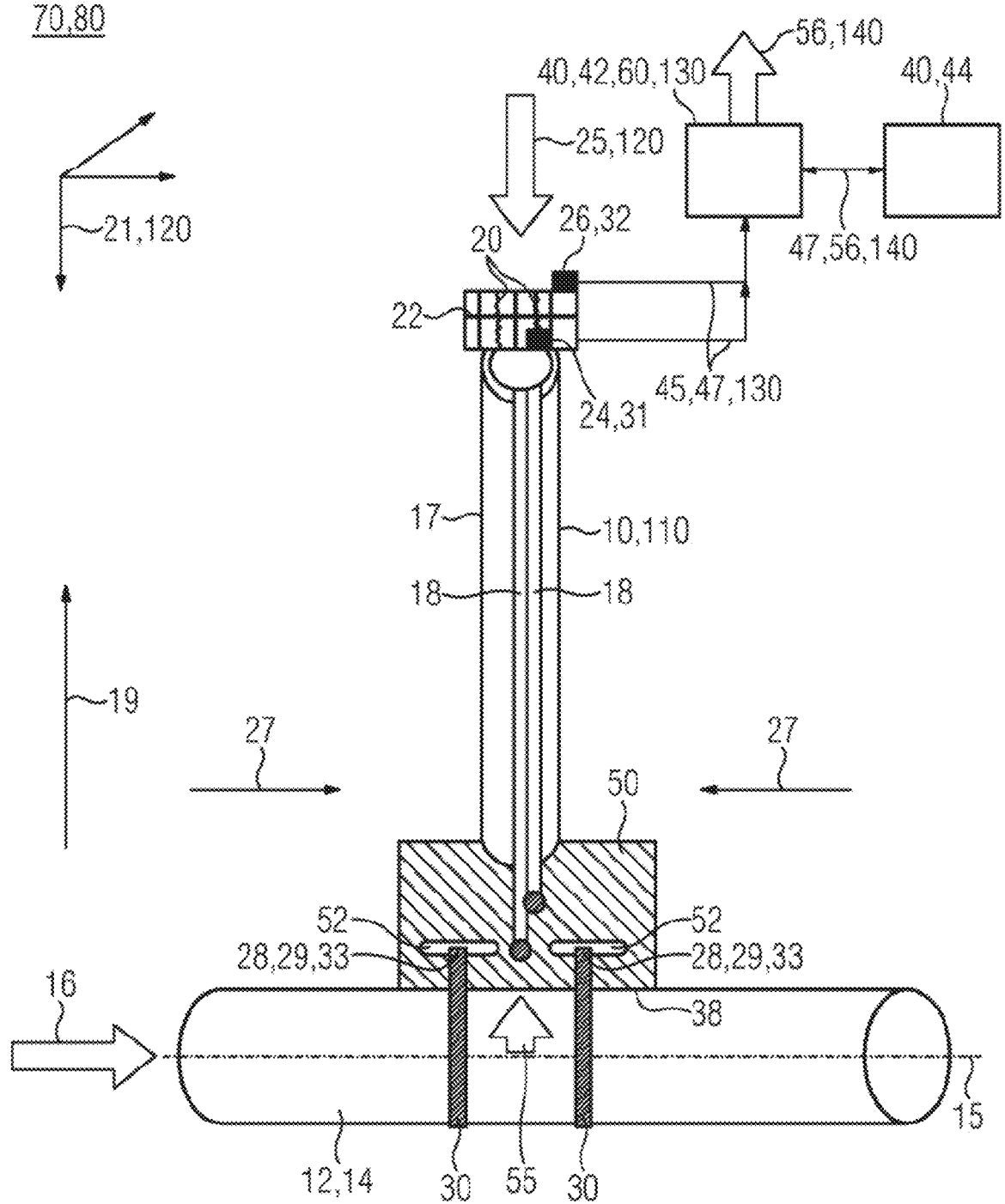
FIG. 2 shows a schematic structure of a second embodiment of the inventive self-monitoring sensor.
Figure 3:
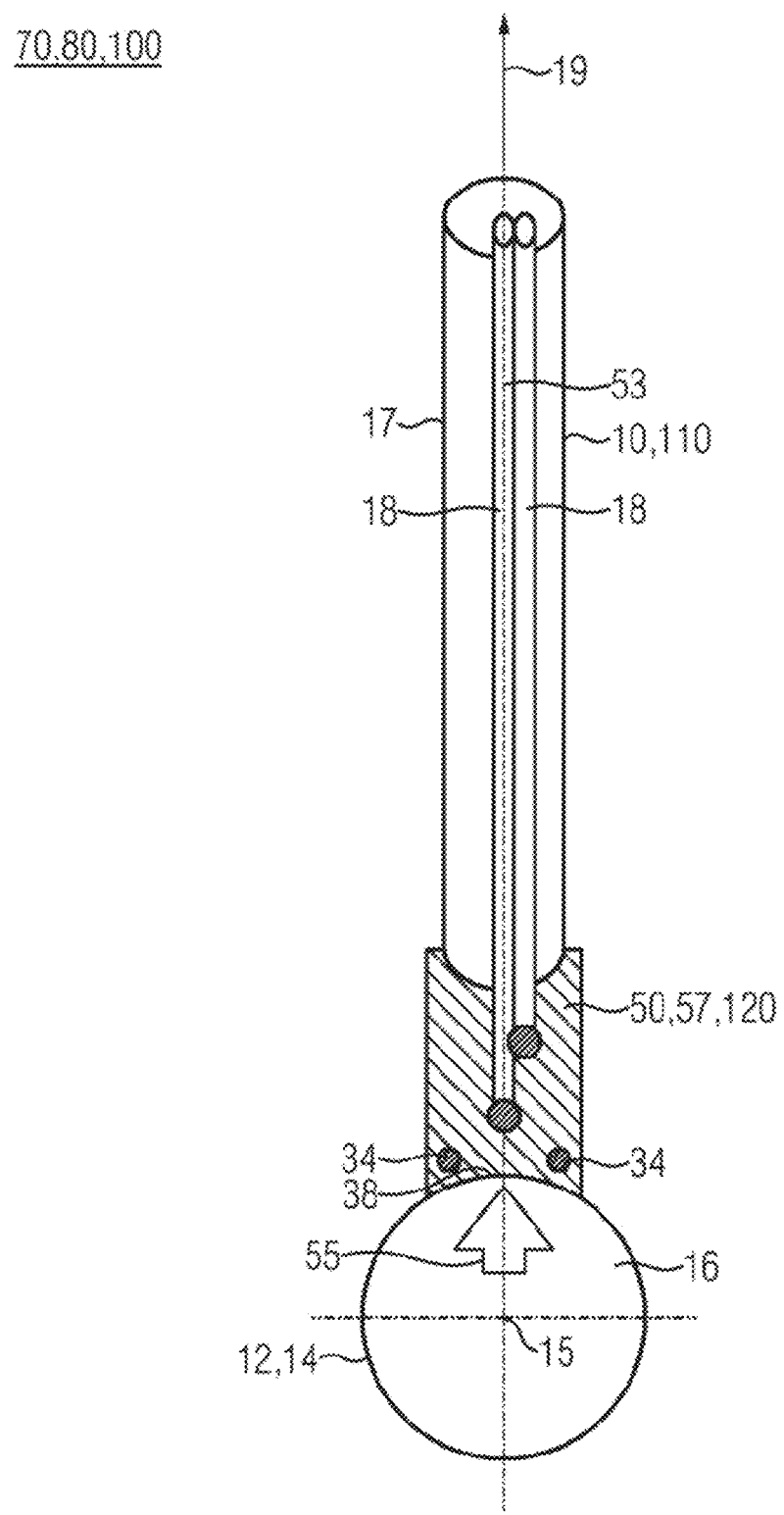
FIG. 3 shows a schematic cross-section of the second embodiment of the inventive self-monitoring sensor.

A side view of a second embodiment of the inventive self-monitoring sensor is illustrated schematically in FIG. 2. A cross-sectional view of the second embodiment is also shown in FIG. 3. Corresponding to the first embodiment illustrated in FIG. 1, in accordance with the second embodiment, the self-monitoring sensor 10 comprises a holder 17, in which sensor elements 18 are received and which belongs to a self-monitoring sensor system 80. The sensor elements 18 are configured as temperature sensors that are in thermal contact at a radial inner end with a thermal coupling element 50. The thermal coupling element 50 is installed on a wall 14 of the measurement object 12 in which a fluid 16 is received and which is configured as a pipe. The thermal coupling element 50 extends substantially parallel to a measurement object axis 15, i.e., a pipe axis. With the fluid 16, a heat flow 55 into the wall 14 of the measurement object 12 is evoked. The thermal coupling element 50 is indirectly or directly in thermally conductive contact with the wall 14 of the measurement object 12 at a contact area 38, so that the heat flow 55 is fed into the thermal coupling element 50 and via the sensor elements 18 18, a temperature of the fluid 16 can be measured non-invasively. The thermal coupling element 50 has recesses through each of which a releasable fastener 30 can be fed. With an action of a force 27 on the self-monitoring sensor 10, shifting between the thermal coupling element 50 and the wall 14 of the measurement object 12 can be caused, such that a size of the contact area 38 can be changed. Accordingly, an improper installation state of the self-monitoring sensor 10 can lead to a temperature distribution 57 in the thermal coupling element 50 deviating from a proper installation state.

In the thermal coupling element 50, fourth detectors 34, which are configured as temperature sensors, are arranged substantially parallel to the measurement object axis 15. The fourth detectors 34 are arranged symmetrically to a plane of symmetry 53 of the thermal coupling element 50. The plane of symmetry 53 is oriented along the radial direction 19. In a proper installation state, an even temperature distribution 57 exists because the fourth detectors 34 substantially generate the same temperature measurement value. However, in an improper installation state, for example, upon tilting of the self-monitoring sensor 10, a deviation occurs between the respective temperature measurement values among the fourth detectors 34.

Similarly to the first embodiment of FIG. 1, the self-monitoring sensor 10 of FIG. 2 and FIG. 3 also has a first detector 31, a second detector 32 and the third detectors 33 that are each connected to a control unit 40 that is configured as a local control unit 42. The third detectors 33 are therein arranged in the region of the recesses in the thermal coupling element 50 and are each suitable for detecting a mechanical stress state 29 that is caused by one of the releasable fasteners 30. The modes of operation of the first detector 31, of the second detector and of the third detectors 33 each correspond to that of FIG. 1.

In a first step 110 of the inventive operating method 100, the self-monitoring sensor 10 is provided in an active operating state. In the active operating state, the self-monitoring sensor 10 is installed on the measurement object 12 and is at least prepared for a measuring operation. In a second step 120, with the first detector 31, a compression force 25 acting upon the sensor element 18 is detected. Similarly, in the second step 120, via the fourth detector 34, a temperature distribution 57 existing in the thermal coupling element 50 is detected. From the first detector 31 and from the fourth detector 34, corresponding measurement signals 45 are transmitted to the control unit 40, in particular, the local control unit 42. In a third step 130, apart from the transmission of the measurement signal 45 to the control unit 40, a recognition takes place of whether an improper installation state of the self-monitoring sensor 10 exists. An improper installation state is recognized if the compression force 25 that is detected in the second step 120 falls below a settable threshold value. Alternatively or additionally, an improper installation state is recognized if the temperature distribution 57 detected in the second step 120 deviates from a reference distribution by at least an adjustable tolerance span. The reduction of the compression force 25 and the deviation of the temperature distribution 57 from the reference distribution that are recognized in this way can be used for a mutual plausibility check of a recognized improper installation state. Further, the detection of the temperature distribution 57 that deviates from the reference distribution in the thermal coupling element 50 can be combined with the detection of the spatial orientation 21 and/or the mechanical stress state via the second detection means or the third detector 33, as already described in relation to FIG. 1.

In a fourth step 140 of the inventive operating method 100, a warning 56 is output to a user via the control unit 40 that is configured as a local control unit 42. Alternatively or additionally, the warning 56 is output in the fourth step 140 to a control unit 40 that is configured as the higher order control unit 40. The local control unit 42 has a monitoring program 60 that is configured to carry out the inventive operating method 100 at least partially. Further, a computer program product 70 is provided which is configured to simulate the operating method 100 of at least the self-monitoring sensor 10. The computer program product 70 is configured, inter alia, to simulate a temperature distribution 57 existing in the thermal coupling element 50, which arises from the heat flow 55 and the contact area 38, in particular the size thereof. As a result, for example, a defective fourth detector can be identified. Accordingly, during the operation of the self-monitoring sensor 10, a defective fourth detector can be ignored in a targeted way and a corresponding further operation is possible because the operating method 100 is, for example, now performed only on the basis of the first detector 31 and the second detector or the third detectors 33. For this purpose, the computer program product is configured as a digital twin of at least the self-monitoring sensor 10.

Figure 4:
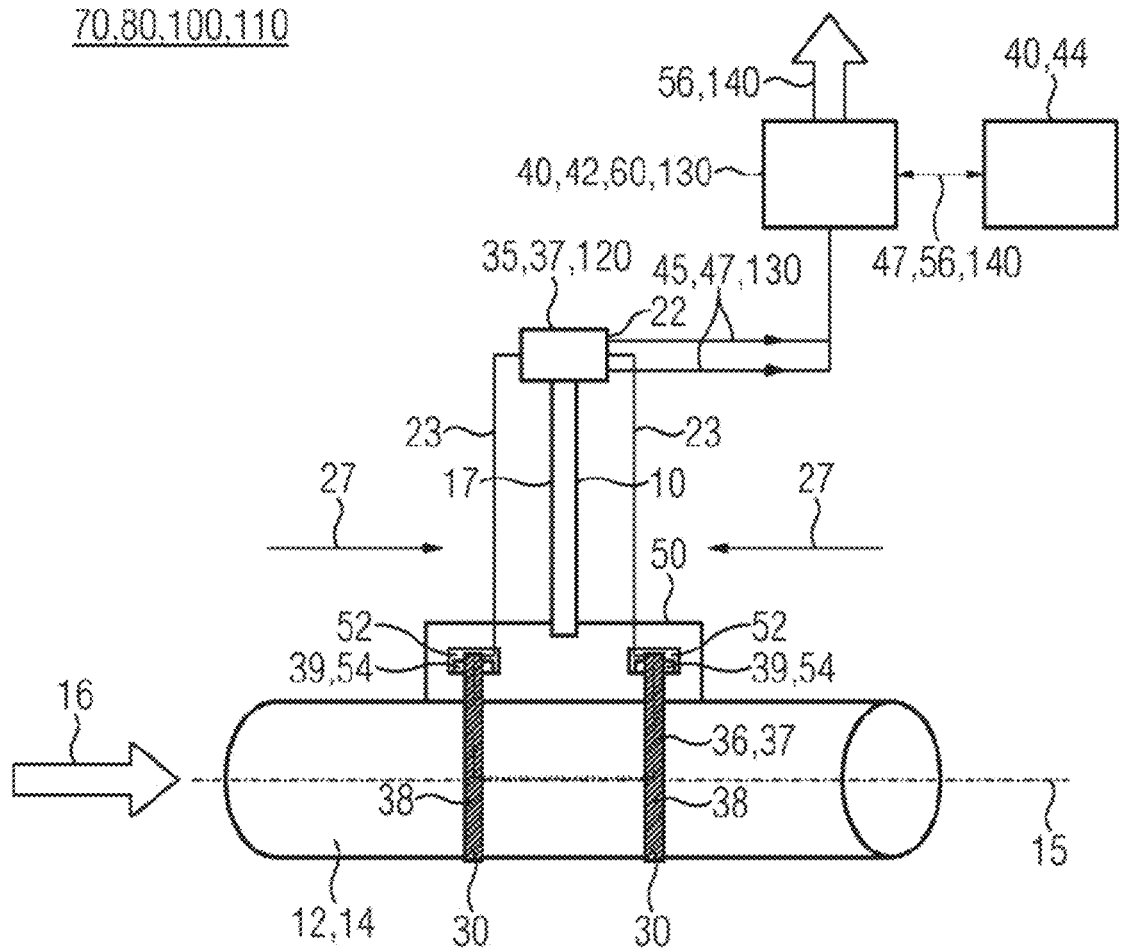
FIG. 4 shows a schematic structure of a third embodiment of the inventive self-monitoring sensor.

FIG. 4 shows schematically the structure of a third embodiment of the self-monitoring sensor 10 in a side view. Similarly to the embodiments of FIGS. 1, 2 and 3, the self-monitoring sensor 10 is arranged on a measurement object 12 in which a fluid 16 is received and which is configured as a pipe. The self-monitoring sensor 10 is configured as a non-invasive temperature measuring apparatus and belongs to a self-monitoring sensor system 80. The self-monitoring sensor 10 comprises a thermal coupling element 50 that is mounted substantially parallel to a measurement object axis 15, i.e., a pipe axis, on a wall 14 of the measurement object 12. The thermal coupling element 50 has recesses 52 through each of which a fastener 30 extends, via which the self-monitoring sensor 10 is releasably fastened to the measurement object 12. A holder 17, to the radial outer end of which a housing 22 is fastened, is mounted on the thermal coupling element 50. Arranged in or on the housing 22 is a fifth detector 35 that is configured to detect an electrical variable 37. For this purpose, the fifth detector 35 is connected with electrical conductors 23 that belong to a circuit 36 in which the electrical variable 37 to be detected exists. The electrical conductors 23 are each electrically conductively connected to a fastener 30. Arranged between the fastener 30 and the thermal coupling element 50, in each case, are insulating elements 54 so that a potential separation 39 exists between the thermal coupling element 50 and the fastener 30. A contact area 38 exists between the fastener 30 and the wall 14 of the measurement object 12, in each case, via which an electrically conductive connection to the wall 14 is formed. The circuit 36 in which the electrical variable 37 is to be detected is formed via the wall 14 of the measurement object 12, the fastener 30 and the electrical conductor 23. In an improper installation state, which is caused by an action of a force 27 on the self-monitoring sensor 10, at least one of the contact areas 38 between the wall 14 of the measurement object 12 and the respective fastener 30 is changed, so that the electrical variable 37 existing in the circuit 36 is changed. The change in the electrical variable 37 can be detected by the fifth detection means 35.

The operating method 100 proceeds therefrom, in the embodiment of FIG. 4, corresponding to FIGS. 1, 2 and 3, that a first step 110 is completed in which the self-monitoring sensor 10 is provided in an active operating state. As a result of the fifth detector 35, the electrical variable 37 is detected during a second step 120. In a third step 130, the detected electrical variable 37 is transmitted in the form of measurement signals 45 via a data connection 47 to a control unit 40 that is configured as a local control unit 42. Further, in the third step 130, the electrical variable 37 is compared with a reference value. An existing improper installation state is recognized if the electrical variable 37 deviates quantitatively by at least an adjustable tolerance value from the reference variable. In a fourth step 140, a warning 56 is output to a user. The warning 56 is similarly output via a data connection 47 to a higher-order control unit 44 that also belongs to the control unit 40, i.e., is at least functionally coupled to the local control unit 42. The local control unit 42 is further equipped with a monitoring program 60 that is configured to implement the inventive operating method 100 at least partially. Furthermore, a computer program product 70 is provided that is configured to simulate the operating behavior of at least the self-monitoring sensor 10. The operating behavior comprises an electrical contact resistance between at least one of the fasteners 30 and the wall 14 of the measurement object 12 and thus of the corresponding contact area 38. With the computer program product 70, it can be established by simulation whether an improper installation state indicated via the fifth detector 35 is plausible in connection with the existing operating situation. In particular, with the computer program product 70, defective components of the self-monitoring sensor 10 can be identified. On the basis thereof, a further operation of the self-monitoring sensor 10 is possible while ignoring the corresponding measurement signal 45 without requiring an early maintenance procedure on the self-monitoring sensor 10. In particular, in combination with further detectors 31, 32, 33, 34 as shown in FIGS. 1, 2 and 3, an increased degree of failure protection can be achieved. For this purpose, the computer program product 70 is configured as a digital twin.

Figure 5:
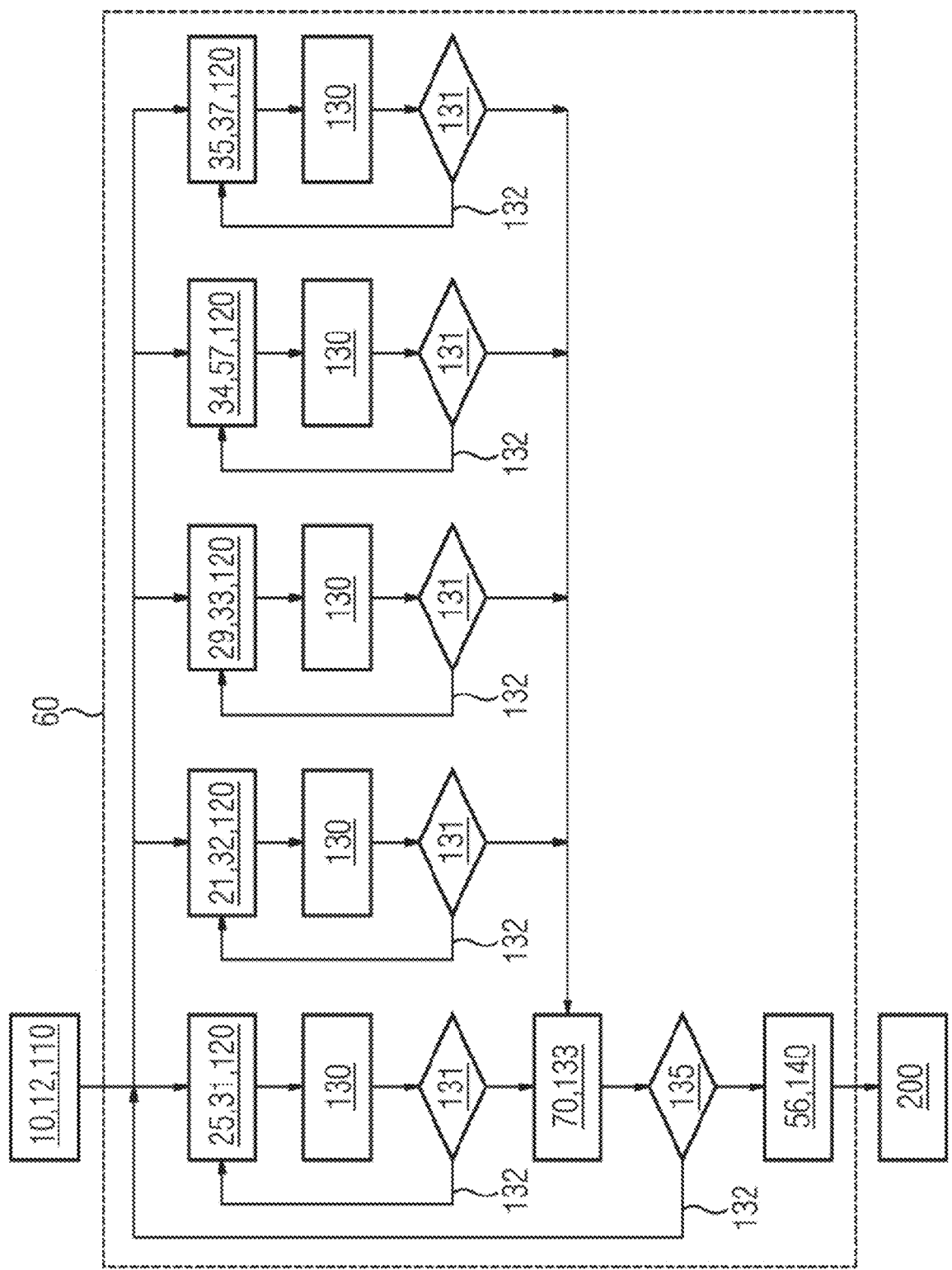
FIG. 5 shows a sequence of an embodiment of the inventive operating method.

FIG. 5 shows a schematic sequence of an embodiment of the inventive operating method 100. The operating method 100 comprises a first step 110 in which a self-monitoring sensor 10 is provided in an active operating state. In the active operating state, the self-monitoring sensor 10 is installed on a measurement object 12 and is functional. A second step 120 follows that is implemented via a plurality of detectors 31, 32, 33, 34, 35 in separate instances, i.e., substantially in parallel. With a first detector 31, a compression force 25 is detected that is exerted in the self-monitoring sensor 10. Substantially simultaneously therewith, via a second detector 32, in the second step 120, a spatial orientation 21 of the self-monitoring sensor 10 is detected. Furthermore, via a third detector 33, a mechanical stress state 29 that exists at the self-monitoring sensor 10 is detected. Similarly, via a fourth detector 34, a temperature distribution 57 in the self-monitoring sensor 10, in particular in a thermal coupling element 50, is detected substantially in parallel. Equally, in the second step 120, an electrical variable 37 is detected substantially in parallel via a fifth detector 35. The detectors 31, 32, 33, 34, 35 are based upon different functional principles and are mutually diversified. Following this, in each case, is a third step 130 in which the variables detected in the associated second step 120 are evaluated. As a result of the third steps 130, an existence of an improper installation state is to be recognized, in each case. Following the third steps 130, in each case, is a first branch 131 where a check is made of whether an improper installation state is recognized in the third step 130. If no improper installation state is recognized, then the operating method 100 for the respective detectors 31, 32, 33, 34, 35 returns via a return path 132 to the second step 120. If an improper installation state is recognized, then a plausibility step 133 occurs in which the results of the third step 130 for a plurality of detectors 31, 32, 33, 34, 35 are combined. In the plausibility step 133, via a mutual comparison, it is established whether the established improper installation state of the self-monitoring sensor 10 is to be confirmed. In addition, the plausibility step 133 can be implemented making use of a computer program product 70 that is configured to simulate the operating behavior of the self-monitoring sensor 10. Following the plausibility step 133 is a second branching 135, where a check is performed to determine whether the plausibility step 133 confirms an improper installation state. If the improper installation state is not confirmed in the plausibility step 133, then the operating method 100 returns via a return path 132 to the second step 120. If the improper installation state is confirmed in the plausibility step 133, then a fourth step 140 occurs in which a warning 56 is output. Thereupon, the operating method 100 reaches an end state 200. The second, third and fourth steps 120, 130, 140, the branches 131, 135 and the plausibility step 133 belong to a monitoring program 60 that is stored in a control unit 40, in particular, a local control unit 42 as shown, for example, in FIG. 1, 2 or 4, in a manner in which it can be executed.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sensor configured to detect an improper installation state of the sensor, the sensor being configured as a non-invasive temperature measuring apparatus and being fastenable to a measurement object which is configured as a pipe, the sensor comprising:
   a holder radially spaced from the measurement object, in which at least one sensor element is received and is fixed via a compression force which is exerted by an elastic element; and
   a first detector, arranged in a region of the elastic element, for detecting the compression force with respect to a settable threshold value to monitor the installation state of the sensor;
   wherein the first detector is configured as a switch; and
   wherein the elastic element is configured such that the at least one sensor element moves, upon removal of the compression force, in order to actuate the switch.

2. The sensor as claimed in claim 1, further comprising:
   a second detector mounted on the measurement object of the holder for detecting a spatial orientation of the holder.

3. The sensor as claimed in claim 1, further comprising:
   a third detector for detecting a mechanical stress state arranged in a region of the fastener and mounted on the sensor;
   wherein the holder is fastened to the measurement object via the fastener.

4. The sensor as claimed in claim 3, wherein the third detector is configured as one of a strain gauge which is arranged on the holder or the fastener and a fiber Bragg grating.

5. The sensor as claimed in claim 1, further comprising:
   a thermal coupling element which is fastenable to the measurement object; and
   fourth detectors received in the thermal coupling element for detecting a temperature distribution to recognize a proper installation on the measurement object.

6. The sensor as claimed in claim 5, wherein the fourth detectors are configured as temperature sensors which are received in the thermal coupling element parallel to the measurement object.

7. The sensor as claimed in claim 5, wherein the fourth detectors are arranged symmetrically to a radial direction of the holder.

8. The sensor as claimed in claim 5, wherein the fourth detectors are arranged symmetrically to a radial direction of the holder.

9. The sensor as claimed in claim 5, further comprising:
   a fifth detector which is configured to detect an electrical variable in a circuit and which comprises at least two fastener via which the sensor is connectable to the measurement object.

10. An operating method for a sensor configured as a non-invasive temperature measuring apparatus, the sensor comprising a holder in which a sensor element is received which is fixable by a compression force exerted by an elastic element, the method comprising:
    a) providing the sensor in an active operating state;
    b) detecting the compression force acting upon the sensor element;
    c) recognizing an improper installation state of the sensor if the compression force which is detected in step b) falls below a settable threshold value; and
    d) outputting a warning regarding the improper installation state to at least one of a user and a higher-order control unit.

11. The operating method as claimed in claim 10, wherein during step b) a spatial orientation of the sensor is detected, and during step c) an improper installation state of the sensor is recognized if the spatial orientation of the sensor detected in step b) deviates from a settable tolerance.

12. The operating method as claimed in claim 11, wherein during step b) a mechanical stress state on a surface of the holder, a thermal coupling element or a fastener via which the sensor is fastened on a measurement object, is also detected via a third detector, and during step c) an improper installation state of the sensor is recognized if a mechanical stress of the mechanical stress state falls below a settable limit stress.

13. The operating method as claimed in claim 12, wherein during step b), an electrical variable of a circuit which comprises at least two fasteners of the sensor is also detected, and during step c) an improper installation state of the sensor is recognized if the electrical variable detected in step b) deviates quantitatively by a settable tolerance value from a reference value.

14. The operating method as claimed in claim 11, wherein during step b) a temperature distribution in the thermal coupling element of the sensor is detected, and during step c) an improper installation state of the sensor is recognized if the temperature distribution detected in step b) deviates by a settable tolerance span from a reference distribution.

15. The operating method as claimed in claim 11, wherein during step b), an electrical variable of a circuit which comprises at least two fasteners of the sensor is also detected, and during step c) an improper installation state of the sensor is recognized if the electrical variable detected in step b) deviates quantitatively by a settable tolerance value from a reference value.

16. The operating method as claimed in claim 10, wherein during step b) a mechanical stress state on a surface of the holder, a thermal coupling element or a fastener via which the sensor is fastened on a measurement object, is also detected via a third detector, and during step c) an improper installation state of the sensor is recognized if a mechanical stress of the mechanical stress state falls below a settable limit stress.

17. The operating method as claimed in claim 16, wherein during step b) a temperature distribution in the thermal coupling element of the sensor is detected, and during step c) an improper installation state of the sensor is recognized if the temperature distribution detected in step b) deviates by a settable tolerance span from a reference distribution.

18. The operating method as claimed in claim 10, wherein during step b) a temperature distribution in the thermal coupling element of the sensor is detected, and during step c) an improper installation state of the sensor is recognized if the temperature distribution detected in step b) deviates by a settable tolerance span from a reference distribution.

19. The operating method as claimed in claim 18, wherein during step b), an electrical variable of a circuit which comprises at least two fasteners of the sensor is also detected, and during step c) an improper installation state of the sensor is recognized if the electrical variable detected in step b) deviates quantitatively by a settable tolerance value from a reference value.

20. The operating method as claimed in claim 10, wherein during step b), an electrical variable of a circuit which comprises at least two fasteners of the sensor is also detected, and during step c) an improper installation state of the sensor is recognized if the electrical variable detected in step b) deviates quantitatively by a settable tolerance value from a reference value.

21. The operating method as claimed in claim 10, wherein the sensor is configured as a non-invasive temperature measuring apparatus and is fastenable to a measurement object which is configured as a pipe.

22. A control unit for monitoring a sensor system which comprises a sensor configured as a non-invasive temperature measuring apparatus, the sensor being couplable to the control unit, the control unit comprising:
　a processor; and
　memory;
　wherein the control unit is configured to:
　　a) provide the sensor in an active operating state;
　　b) detect a compression force acting upon a sensor element;
　　c) recognize an improper installation state of the sensor if the compression force which is detected in step b) falls below a settable threshold value; and
　　d) output a warning regarding the improper installation state to a user.

23. A non-transitory computer-readable program product encoded with a digital twin of a self-monitoring sensor which, when executed during a simulation of an operating behavior of a correspondingly configured sensor configured as a non-invasive temperature measuring apparatus, causes simulation of operation of the self-monitoring sensor, the digital twin comprising:
　　a) program code for providing the sensor in an active operating state;
　　b) program code for detecting the compression force acting upon the sensor element;
　　c) program code for recognizing an improper installation state of the sensor if the compression force which is detected in step b) falls below a settable threshold value; and
　　d) program code for outputting a warning regarding the improper installation state to at least one of a user and a higher-order control unit.

* * * * *